United States Patent Office 3,258,473
Patented June 28, 1966

1

3,258,473
17-DIHALOACETATE ESTERS OF 17α-HYDROXY-
21-DESOXYPREGNANE DERIVATIVES
Fred A. Kincl, Atherton, Calif., assignor to Syntex Corporation, Panama, Panama, a corporation of Panama
No Drawing. Filed Oct. 4, 1963, Ser. No. 313,796
19 Claims. (Cl. 260—397.4)

This invention relates to novel cyclopentanopolyhydrophenanthrene derivatives and to processes for their preparation.

More particularly, this invention relates to novel 17-dihaloacetate esters of 17α-hydroxy-21-desoxypregnane derivatives, such as those compounds represented by the general formula:

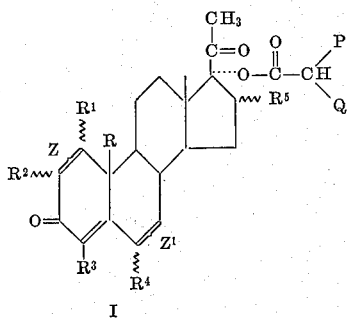

I

In the above formula R, $R^1$, $R^2$ and $R^5$ each represent hydrogen or methyl; $R^3$ represents hydrogen, fluorine or chlorine; $R^4$ represents hydrogen, methyl, fluorine or chlorine; Z represents either a double bond or a saturated linkage between the carbon atoms at the 1- and 2-positions; $Z^1$ represents either a double bond or a saturated linkage between the carbon atoms at the 6- and 7-positions; the symbol ξ indicates that a substituent attached thereby to the steroid nucleus can be in either the α- or the β-configuration when there are saturated linkages between the carbon atom to which it is attached and each of the carbon atoms adjacent thereto, and P and Q each represent either fluorine or chlorine.

Compounds such as those represented by formula I above are prepared by simply esterifying the free 17α-hydroxyl group in known 17α-hydroxy-21-desoxypregnane derivatives, such as those represented by the general formula:

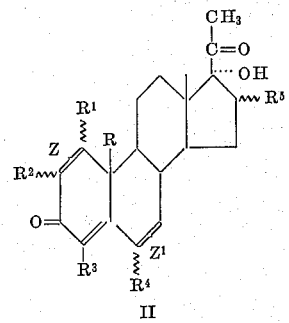

II wherein R, $R^1$, $R^2$, $R^3$, $R^4$, $R^5$, Z and $Z^1$ have the same meanings as set forth hereinabove for Formula I with a dihalo acetic acid, a dihalo acetyl halide or a dihalo acetic anhydride wherein the halogen atoms attached to the acetyl moiety are either fluorine or chlorine.

The present invention is based on the surprising and unexpected discovery that esterification of the 17α-hy-

2 droxyl group in these known 17α-hydroxy-21-desoxypregnane derivatives with the above described dihaloacetoxy groups potentiates their progestational activity, thus permitting them to be used therapeutically at dosage levels at which the corresponding conventional 17-esters, e.g., the acetates, are no longer sufficiently active.

This esterification reaction, as previously indicated, can be carried out using either a free dihaloacetic acid, i.e., dichloroacetic acid, difluoroacetic acid or fluoro chloroacetic acid, a corresponding acid halide, preferably the hloride, e.g., dichloroacetyl chloride and the like, or a dihaloacetic anhydride, e.g., dichloroacetic anhydride and the like. The various esterification procedures which can be employed have all previously been used in conventionally esterifying steroidal hydroxyl groups. Thus, for example, when using a dihalo acetyl halide, the esterification reaction can be carried out in an inert organic solvent, such as benzene, toluene, xylene and the like, as well as mixtures thereof, either in the absence of any esterification catalyst or together with a catalytic amount of a strongly acidic substance such as methanesulfonic acid, benzenesulfonic acid, p-toluenesulfonic acid, and the like, at a temperature ranging from about 50° C. or lower to reflux temperature for from about 8 hours to about 24 hours or longer. Esterification can also be carried out using a dihalo acetyl halide and pyridine, preferably in about a mole-for-mol ratio, in an inert organic solvent, such as benzene, toluene, xylene and the like, as well as mixtures thereof, and in the absence of any acidic esterification catalyst. This reaction will generally be carried out at reflux temperature for periods of time ranging from about 3 days to about 7 days. Finally, esterification can be accomplished using a free dihalo acetic acid or the anhydride thereof by reaction in an inert organic solvent, such as benzene, toluene, xylene, and the like, as well as mixtures thereof, in the presence of a strongly acidic esterification catalyst. This latter esterification procedure will generally be carried out at reflux temperature for periods of time ranging up to about 15 hours or more, with provision being made for the continual removal of water formed during the reaction.

In working up the reaction mixtures obtained using the first two of the above-described procedures, the reaction mixture is usually washed first with dilute aqueous hydrochloric acid and then with an aqueous solution of sodium carbonate, while in working up the reaction mixtures obtained using the third of these procedures, the hydrochloric acid wash is omitted. In either case, however, conventional evaporation, drying, crystallization and/or chromatography techniques can be employed to isolate the final prdoucts.

Whenever necessary, 17α-acyloxy-21-desoxypregnanes which have been esterified at the 17α-position with conventional acyl groups, e.g., acetates, propionates, enanthates, and the like, can be deesterified by conventional procedures, e.g., by refluxing them with aqueous sodium hydroxide and the like, in order to provide a free 17α-hydroxyl group which can then be reesterified with a dihaloacetyl group as described hereinabove.

An illustrative but by no means exhaustive listing of 17α-hydroxy-21-desoxypregnane derivatives coming within the scope of Formula II above which can be esterified according to the practice of the present invention includes: 17α-hydroxyprogesterone, 2α-methyl-17α-hydroxyprogesterone, 6α-methyl - 17α - hydroxyprogesterone, 6β-methyl-17α-hydroxyprogesterone, 16α-methyl - 17α - hydroxyprogesterone, 4-fluoro - 17α - hydroxyprogesterone, 4-chloro-17α-hydroxyprogesterone, 6α-fluoro-17α-hydroxyprogesterone, 6α-chloro-17α-hydroxyprogesterone, 6α,-16α-dimethyl-17α-hydroxyprogesterone, 6α-16β-dimethyl-17α-hydroxyprogesterone, 4 - fluoro - 16α - methyl-17α-hydroxyprogesterone, 4-chloro-16α-methyl-17α-hydroxyprogesterone, 6α-fluoro-16α-methyl-17α-hydroxyprogesterone, 6α-fluoro-16β-methyl-17α-hydroxyprogesterone, 6β-fluoro-16α-methyl-17α - hydroxyprogesterone, 6α - chloro - 16α-methyl-17α-hydroxyprogesterone, 6α-chloro-16β-methyl-17α-hydroxyprogesterone, 6β-chloro-16α-methyl-17α-hydroxyprogesterone, 17α-hydroxy - 19 - nor - progesterone, 1α-methyl-17α-hydroxy-19 - nor - progesterone, 6α-fluoro-17α-hydroxy-19-nor-progesterone, 6β-fluoro-17α-hydroxy-19-nor-progesterone, 17α-hydroxy-1-dehydroprogesterone, 6α-methyl - 17α - hydroxy - 1 - dehydroprogesterone, 16α-methyl-17α-hydroxy-1-dehydroprogesterone, 4-fluoro-17α-hydroxy-1-dehydroprogesterone, 4-chloro-17α-hydroxy-1-dehydroprogesterone, 6α-fluoro - 17α-hydroxy-1-dehydroprogesterone, 6α-chloro-17α-hydroxy-1-dehydroprogesterone, 6α,16α-dimethyl-17α-hydroxy - 1 - dehydroprogesterone, 6α,16β-dimethyl-17α-hydroxy - 1 - dehydroprogesterone, 6α-fluoro-16α - methlyl-17α-hydroxy-1-dehydroprogesterone, 6β-chloro-16α-methyl-17α-hydroxy-1-dehydroprogesterone, 6α-chloro-16α-methyl-17α-hydroxy-1-dehydroprogesterone, 6β-chloro-16α-methyl-17α-hydroxy-1-dehydroprogesterone, 6-methyl-17α-hydroxy-6-dehydroprogesterone, 4-fluoro-17α-hydroxy - 6 - dehydroprogesterone, 4-chloro-17α-hydroxy - 6 - dehydroprogesterone, 6-fluoro-17α - hydroxy - 6 - dehydroprogesterone, 6-chloro-17α-hydroxy-6-dehydroprogesterone, 6,16α - dimethyl - 17α - hydroxy-6-dehydroprogesterone, 6-fluoro - 16α - methyl-17α-hydroxy-6-dehydroprogesterone, 6 - chloro - 16α - methyl-17α - hydroxy - 6 - dehydroprogesterone, 6-fluoro-17α-hydroxy - 19 - nor - 6 - dehydroprogesterone, 6-chloro-17α-hydroxy-19-nor - 6 - dehydroprogesterone, 6 - methyl - $\Delta^{1,4,6}$-pregnatrien-17α-ol-3,20-dione, 4-fluoro-$\Delta^{1,4,6}$-pregnatrien-17α-ol-3,20-dione, 4-chloro-$\Delta^{1,4,6}$-pregnatrien-17α-ol-3,20-dione, 6-chloro-$\Delta^{1,4,6}$-pregnatrien-17α-ol-3,20-dione, 6,16α-dimethyl-$\Delta^{1,4,6}$-pregnatrien-17α-ol - 3,20 - dione, 6-fluoro-16α-methyl-$\Delta^{1,4,6}$-pregnatrien-17α-ol-3,20-dione, 6-chloro-16α-methyl-$\Delta^{1,4,6}$-pregnatrien-17α-ol-3,20-dione, and the like.

In order that those skilled in the art can more fully understand the present invention, the following examples are set forth. These examples are given solely for the purpose of illustration, and should not be considered as expressing limitations unless so set forth in the appended claims.

Example I

A mixture of 1 gram of 17α-hydroxyprogesterone, 2 cc. of dichloroacetyl chloride, 50 cc. of anhydrous benzene and 200 mg. of p-toluenesulfonic acid, contained in a suitable reaction vessel equipped with a reflux condenser, was refluxed for 18 hours. Following this reaction period, the reaction mixture was poured into a slurry of ice and water. The benzene layer was separated, washed with dilute aqueous hydrochloric acid, then with 5% aqueous sodium carbonate, and finally with water, and then evaporated to dryness. Crystallization of the resulting residue from acetonehexane gave 17α-hydroxy-progesterone 17-dichloroacetate in substantially quantitative yield.

Examples II and III

The procedure of Example I was repeated in each of these examples in every detail but one, namely, dichloroacetyl chloride was replaced by difluoroacetyl chloride and fluorochloro-acetyl chloride respectively. Substantially quantitative yields of 17α-hydroxyprogesterone 17-difluoro-acetate and 17-fluorochloroacetate, respectively, were obtained.

Examples IV–VI

By using 4-chloro-17α-hydroxy-6-dehydroprogesterone in place of 17α-hydroxyprogesterone in the procedure of Examples I, II and III, the 17-dichloroacetate, 17-difluoroacetate and 17-fluorochloroacetate, respectively, of 4 - chloro - 17α - hydroxy - 6 - dehydroprogesterone were obtained in substantially quantitative yields.

Examples VII–IX

The procedure employed in Example I was again repeated in every detail in each of these examples with one exception, namely, 17α-hydroxyprogesterone was replaced by 6α-methyl-17α-hydroxyprogesterone, 16α-methyl-17α-hydroxy-progesterone and 6α-fluoro-16α-methyl-17α-hydroxyprogesterone, respectively. Substantially quantitative yields of the 17-dichloroacetates of 6α-methyl-17α-hydroxyprogesterone, 16α-methyl-17α-hydroxyprogesterone and 6α-fluoro-16α-methyl-17α-hydroxyprogesterone were obtained.

Example X

A mixture of 1 gram of 4-chloro-17α-hydroxyprogesterone, 2 cc. of dichloroacetyl chloride, 50 cc. of anhydrous benzene and 50 cc. of anhydrous pyridine, contained in a suitable reaction vessel, equipped with a reflux condenser, was refluxed for 96 hours. Following this reaction period, the reaction mixture was poured into ice water, forming a precipitate which was then filtered, washed in succession with dilute aqueous hydrochloric acid, 5% aqueous sodium carbonate, and water, and then dried. Crystallization of the dried precipitate from acetone-hexane resulted in a substantially quantitative yield of 4-chloro-17α-hydroxyprogesterone 17-dichloroacetate.

Example XI

To a solution of 5 grams of 17α-hydroxy-19-nor-progesterone in 200 cc. of benzene, contained in a suitable reaction vessel equipped with a reflux condenser and a distillation column for the removal of water formed during the reaction, there were added 10 grams of dichloroacetic anhydride and 1 gram of p-toluenesulfonic acid. The resulting reaction mixture was refluxed for 12 hours, then poured into a slurry of ice and water. Next, the benzene layer was separated, washed with a 5% aqueous sodium bicarbonate solution and then with water, and evaporated to dryness. Crystallization of the resulting residue from diethyl ether-hexane gave 17α-hydroxy-19-nor-progesterone 17-dichloroacetate in substantially quantitative yield.

Examples XII–XIV

The procedure of Example XI was repeated in every detail in each of these examples except for the following. First of all, 17α-hydroxy-19-nor-progesterone was replaced by 6α-fluoro-17α-hydroxy-19-nor-progesterone, 4-fluoro-17α-hydroxy-1-dehydroprogesterone and 6-chloro-17α-hydroxy-6-dehydroprogesterone, respectively. Secondly, dichloroacetic anhydride was replaced by dichloroacetic acid, difluoroacetic acid and fluorochloroacetic acid, respectively. Finally, the resulting reaction mixtures were refluxed overnight. Substantially quantitative yields of 6α-fluoro-17α-hydroxy-19-nor-progesterone 17-dichloroacetate, 4-fluoro - 17α - hydroxy-1-dehydroprogesterone 17-difluoroacetate and 6-chloro-17α-hydroxy-6-dehydroprogesterone 17-fluorochloroacetate, respectively, were obtained.

It will be obvious to those skilled in the art that other changes and variations can be made in carrying out the present invention without departing from the spirit and scope thereof as defined in the appended claims.

I claim:

1. A 3,20-diketo-17α-dihaloacetoxy-21-desoxypregn-4-ene wherein the halogen atoms of said haloacetoxy group are selected from the group consisting of chlorine and fluorine.

2. A compound according to claim 1 wherein the dihaloacetoxy group is dichloroacetoxy.

3. A compound according to claim 1 wherein the dihaloacetoxy group is difluoroacetoxy.

4. A compound according to claim 1 wherein the dihaloacetoxy group is fluorochloroacetoxy.

5. A compound represented by the general formula:

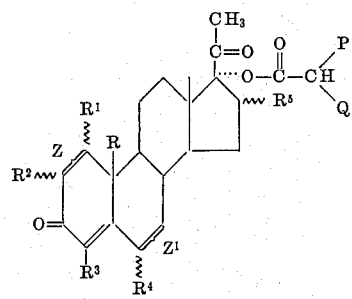

wherein R, $R^1$, $R^2$ and $R^5$ are each selected from the group consisting of hydrogen and methyl; $R^3$ is selected from the group consisting of hydrogen, fluorine and chlorine; $R^4$ is selected from the group consisting of hydrogen, methyl, fluorine and chlorine; Z and $Z^1$ are selected from the group consisting of a double bond and a saturated linkage between the carbon atoms at the 1- and 2- and 4- and 5- positions, respectively, and P and Q are each selected from the group consisting of fluorine and chlorine.

6. 17α-hydroxyprogesterone-17-dichloroacetate.
7. 17α-hydroxyprogesterone-17-difluoroacetate.
8. 17α-hydroxyprogesterone-17-fluorochloroacetate.
9. 4-chloro-17α-hydroxy-6-dehydroprogesterone-17 - dichloroacetate.
10. 4-chloro-17α-hydroxy-6-dehydroprogesterone - 17- difluoroacetate.
11. 4-chloro-17α-hydroxy-6-dehydroprogesterone - 17- fluorochloroacetate.
12. 6α-methyl-17α-hydroxyprogesterone-17 - dichloroacetate.
13. 16α-methyl-17α-hydroxyprogesterone-17 - dichloroacetate.
14. 6α-fluoro-16α-methyl-17α-hydroxyprogesterone - 17- dichloroacetate.
15. 4-chloro-17α-hydroxyprogesterone - 17 - dichloroacetate.
16. 17α-hydroxy-19-nor-progesterone - 17 - dichloroacetate.
17. 6α-fluoro-17α-hydroxy-19-nor-progesterone-17 - dichloroacetate.
18. 4-fluoro-17α-hydroxy-1-dehydroprogesterone - 17- difluoroacetate.
19. 6-chloro-17α-hydroxy-6-dehydroprogesterone - 17- fluorochloroacetate.

References Cited by the Examiner
UNITED STATES PATENTS
3,067,213   1/1962   Ringold et al. _____ 260—397.4

LEWIS GOTTS, *Primary Examiner.*
ELBERT L. ROBERTS, *Examiner.*